United States Patent [19]
Judet et al.

[11] Patent Number: 6,017,189
[45] Date of Patent: Jan. 25, 2000

[54] COOLING SYSTEM FOR TURBINE BLADE PLATFORMS

[75] Inventors: Maurice Judet, Dammarie Les Lys; Marc Roger Marchi, Le Mee, both of France

[73] Assignee: Societe National D'Etede et de Construction de Moteurs D'Aviation (S.N.E.C.M.A.), France

[21] Appl. No.: 09/013,238

[22] Filed: Jan. 26, 1998

[30] Foreign Application Priority Data

Jan. 30, 1997 [FR] France ................................... 97 00987

[51] Int. Cl.$^7$ ........................................................ B63H 1/26
[52] U.S. Cl. .................................... 416/97 R; 416/193 A; 416/248
[58] Field of Search .................................. 416/97 R, 95, 416/193 A, 248; 415/115, 116

[56] References Cited

U.S. PATENT DOCUMENTS

| | | |
|---|---|---|
| 4,726,735 | 2/1988 | Field et al. . |
| 5,167,485 | 12/1992 | Starkweather .......................... 415/115 |
| 5,281,097 | 1/1994 | Wilson et al. . |
| 5,382,135 | 1/1995 | Green . |
| 5,415,526 | 5/1995 | Mercadante et al. .................... 416/190 |
| 5,513,955 | 5/1996 | Barcza . |

FOREIGN PATENT DOCUMENTS

| | | |
|---|---|---|
| 2 726 323 | 5/1996 | France . |
| 2 239 679 | 7/1991 | United Kingdom . |
| WO 96/13653 | 5/1996 | WIPO . |

*Primary Examiner*—Edward K. Look
*Assistant Examiner*—Ninh H. Nguyen
*Attorney, Agent, or Firm*—Bacon & Thomas PLLC

[57] ABSTRACT

A cooling system is disclosed for cooling the platforms of turbine blades fixed to the periphery of a turbine rotor, each turbine blade having an airfoil portion, a platform with opposite longitudinal edges, a root portion affixed to the turbine rotor, and a shank portion connecting the root portion to the platform. Adjacent turbine blades are located such that a longitudinal edge of one platform is adjacent to a longitudinal edge of an adjacent platform. A cavity is formed bounded by a portion of the periphery of the turbine rotor, the shank portions of the adjacent turbine blades, and the platforms of the adjacent turbine blades. A cooling air passage supplies cooling air to the cavity. One or more cooling channels are formed in a side of the platform facing the turbine rotor, each cooling channel having a cooling air collector at an end located adjacent to the air supply passage and communicating with the cavity. The cooling channels also include venting holes distributed along each of the cooling channels. A sealing plate extends across surfaces of adjacent platforms facing toward the turbine rotor so as to seal any gap existing between the adjacent longitudinal edges of the platform. The sealing plate covers the cooling channels to form cooling passages, the sealing plate having an orifice aligned with the cooling air collector of the cooling channel to enable cooling air from the cavity to enter the cooling channel and exit through the plurality of venting holes to cool the blade platform. The cavities are, in known fashion, sealed at their forward and rear ends by annular seals affixed to the turbine rotor.

9 Claims, 2 Drawing Sheets

COOLING SYSTEM FOR TURBINE BLADE PLATFORMS

BACKGROUND OF THE INVENTION

The present invention relates to a system for ventilating or cooling the platforms of turbine blades.

Jet engine aircraft designers and manufacturers are continuously seeking ways to improve the performance of aircraft jet engines. One of the desired improvements is the lowering of specific fuel consumption of the jet engines, which may be accomplished by operating the engine at the highest possible temperatures at the turbine inlet. The specific fuel consumption may be increased by increasing the engine compression ratio which causes an increase in temperature at the outlet of the compressor. The increase in temperature at the turbine inlet also increases the engine thrust.

If these operating conditions can be achieved, it is possible to reduce the amount fuel carried by the aircraft to travel a certain distance, or to travel a longer distance given the same fuel quantity, and to lower the weight and size of the jet engine while the thrust remains the same.

However, the temperature at the turbine inlet is limited by the mechanical strength of the nozzle vanes and turbine blades. The mechanical properties of these elements are markedly reduced at extremely high temperatures. The rotor blades are also subjected to high centrifugal forces due to the high rotational speeds of the turbine rotor. In order to maintain the mechanical integrity of the turbine blades, the walls of the airfoil portion of the blades must be cooled, as must be the blade platforms which are attached to the blades and which form an inner boundary for the hot gas flowing over the airfoil portion of the blades.

SUMMARY OF THE INVENTION

A cooling system is disclosed for cooling the platforms of turbine blades fixed to the periphery of a turbine rotor, each turbine blade having an airfoil portion, a platform with opposite longitudinal edges, a root portion affixed to the turbine rotor, and a shank portion connecting the root portion to the platform. Adjacent turbine blades are located such that a longitudinal edge of one platform is adjacent to a longitudinal edge of an adjacent platform. A cavity is formed bounded by a portion of the periphery of the turbine rotor, the shank portions of the adjacent turbine blades, and the platforms of the adjacent turbine blades. A cooling air passage supplies cooling air to the cavity. One or more cooling channels are formed in a side of the platform facing the turbine rotor, each cooling channel having a cooling air collector at an end located adjacent to the air supply passage and communicating with the cavity. The cooling channels also include venting holes distributed along each of the cooling channels. A sealing plate extends across surfaces of adjacent platforms facing toward the turbine rotor so as to seal any gap existing between the adjacent longitudinal edges of the platform. The sealing plate covers the cooling channels to form cooling passages, the sealing plate having an orifice aligned with the cooling air collector of the cooling channel to enable cooling air from the cavity to enter the cooling channel and exit through the plurality of venting holes to cool the blade platform. The cavities are, in known fashion, sealed at their forward and rear ends by annular seals affixed to the turbine rotor.

U.S. Pat. No. 4,726,735 discloses a blade cooling system having slots in the platforms extending generally parallel to the axis of rotation of the turbine rotor for evacuating cooling air from the cavities. This system, however, does not disclose seals to seal the gaps between adjacent platforms.

U.S. Pat. No. 5,382,135 discloses a turbine blade cooling system having oblique orifices through the radial thickness of the platform to establish communication between the cavity and the hot gas flow. The oblique orifices issue in the vicinity of the axial edge of the high pressure side of the platform. In both of these systems, the path of the cooling air through the slots and orifices is relatively short, thereby enabling only very low heat exchange between the cooling air and the platform.

French Patent 2 726 323 discloses a turbine blade system incorporating small sealing plates beneath the platform to seal the gaps between the adjacent platforms, the plates being urged against an inner surface of the platform by centrifugal forces generated by turbine rotor rotation. This system does not include any platform cooling systems.

DETAILED DESCRIPTION OF THE PREFERRED EMBODIMENT

Figure 1:
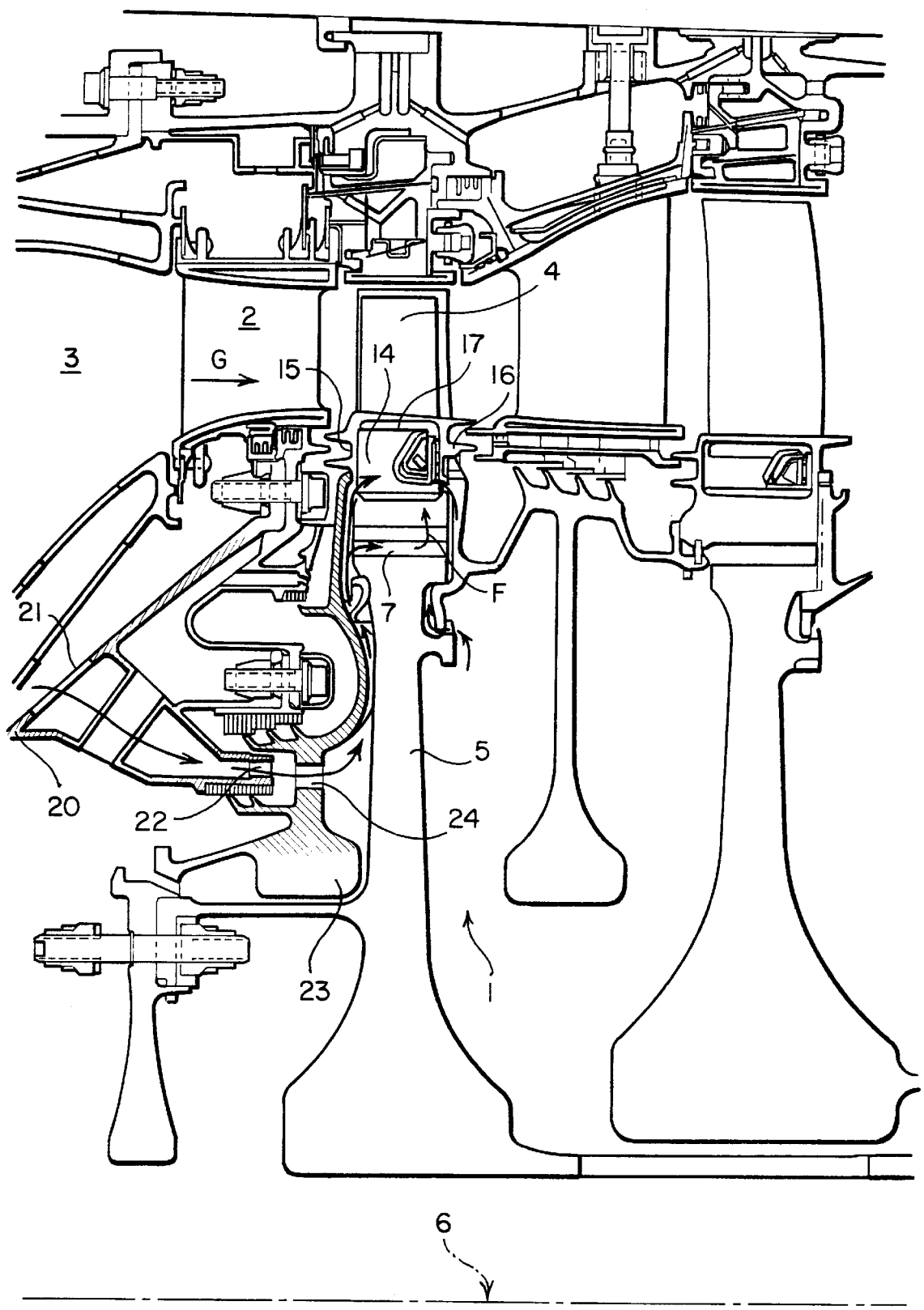
FIG. 1 is a partial, cross-sectional view of a turbine of a gas turbine engine according to the present invention.

FIG. 1 illustrates the high pressure turbine 1 portion of a gas turbine jet aircraft engine which is mounted to the rear, or downstream, of vanes 2 mounted at an outlet of combustion chamber 3. The turbine 1 comprises turbine blades 4 mounted radially on a periphery of turbine rotor 5 which rotates about axis of rotation 6. The turbine rotor 5 comprises a plurality of openings 7, each of which receives a root portion 8 of a turbine blade 4. The openings 7 and the root portions 8 have complementary shapes, being dovetailed or the like, so as to affix the turbine blades 4 to the turbine rotor 5.

Each turbine blade 4 comprises a platform 10 having opposite longitudinal edges 11a and 11b which extend substantially parallel to the axis of rotation 6 and a shank 12 connecting the root portion 8 to the platform 10. Adjacent turbine blades 4a and 4b are configured such that one of the longitudinal edge 11a of one blade is located adjacent to a longitudinal edge 11b of the adjacent blade, the adjacent longitudinal edges bounding an axially extending radial gap 13.

Figure 2:
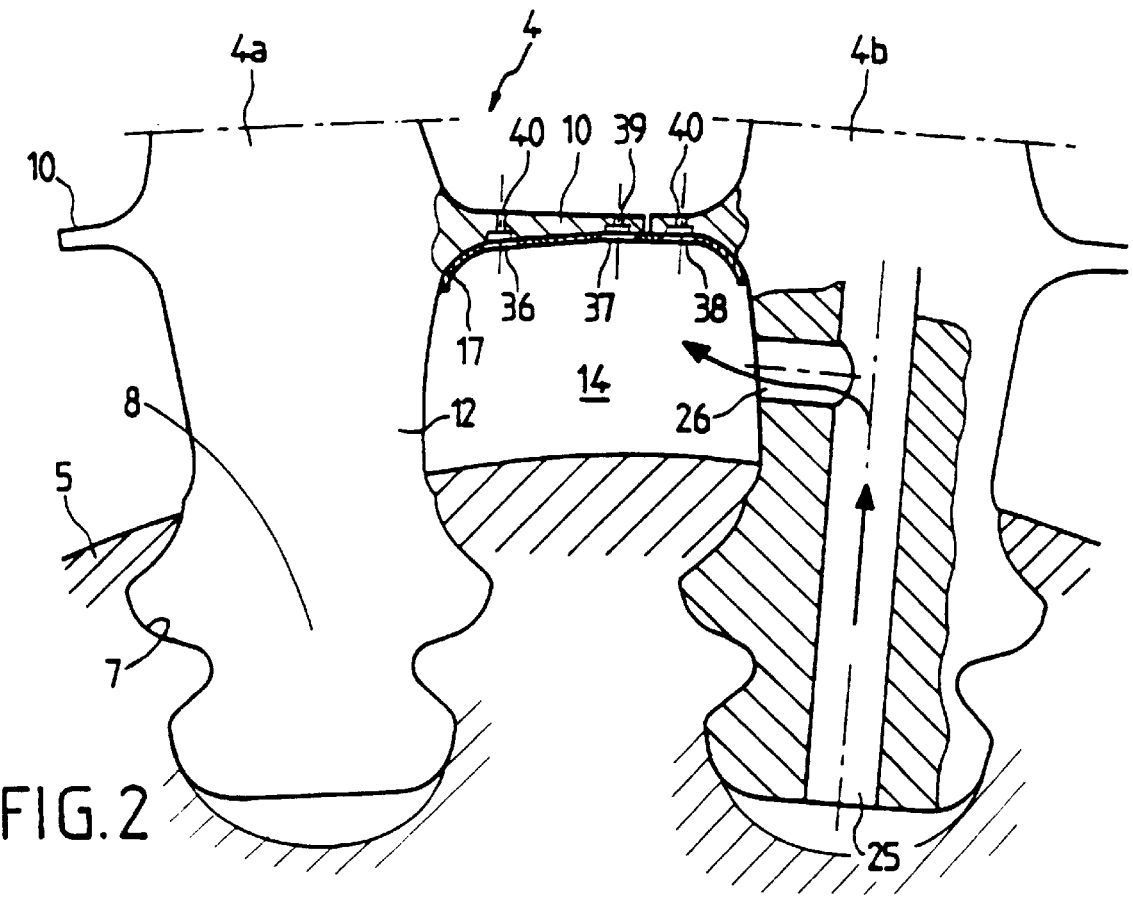
FIG. 2 is a partial, cross-sectional view taken along a plane perpendicular to the axis of rotation of the turbine rotor of FIG. 1.

The platforms 10 are displaced radially outwardly from a periphery of the turbine rotor 5, as best illustrated in FIG. 2. A cavity 14 is thus formed and is bounded by a portion of the outer periphery of the turbine rotor 5, the shanks 12 of the adjacent turbine blades and by inner surfaces of adjacent platforms 10. The axial, front and rear ends of each cavity 14 are sealed by walls 15 and 16, illustrated best in FIG. 1, formed by rings affixed to both sides of the turbine rotor 5, or affixed by brackets to the shanks 12.

A sealing plate 17 is located in the cavity 14 and covers the inner surfaces of the adjacent platforms 10, which surfaces face toward the periphery of the turbine rotor 5. The sealing plate 17 seals the gap 13 between the adjacent longitudinal edges 11a and 11b of adjacent platforms 10. The outer surface of the sealing plate 17 is biased against the inner surface of the two adjacent platforms by centrifugal force when the turbine 1 is rotated by hot gas flow G issuing from the combustion chamber 3.

The platforms 10 are cooled by cooling air flow F which has a temperature lower than that of the hot gas flow G. The cooling air flow F may emanate from an upstream portion of the combustion chamber, from the compressors of the jet engine, or from another external source. FIG. 1 illustrates the cooling air emanating from an upstream portion of the combustion chamber 3 which passes through orifices 21 and 22 in the inner casing of chamber 20, and passes through flange 23 of the forward, or upstream, labyrinth seal through openings 24. The cooling air flow F reaches the openings 7 of the turbine rotor 5, the root portions 8 of the turbine plates 4 and the cavities 14 through passages 25 and 26 in the root portions 8, the passages 25 also supplying cooling air to the airfoil portions of the turbine blades 4. The cooling air may also come from a downstream compartment between the high pressure turbine 1 and the rearwardly located low pressure turbine.

The cavities 14 may also be fed with cooling air through the forward or rear side of the turbine rotor 5 depending upon the particularities of a particular installation. The cooling air flow F may move on the forward side of the turbine rotor 5 through the space separating the flange 23 of the labyrinth seal forwardly of the turbine rotor 5, or along the rear side through the space separating the turbine rotor 5 from the rearwardly located, low pressure turbine.

Figure 3:
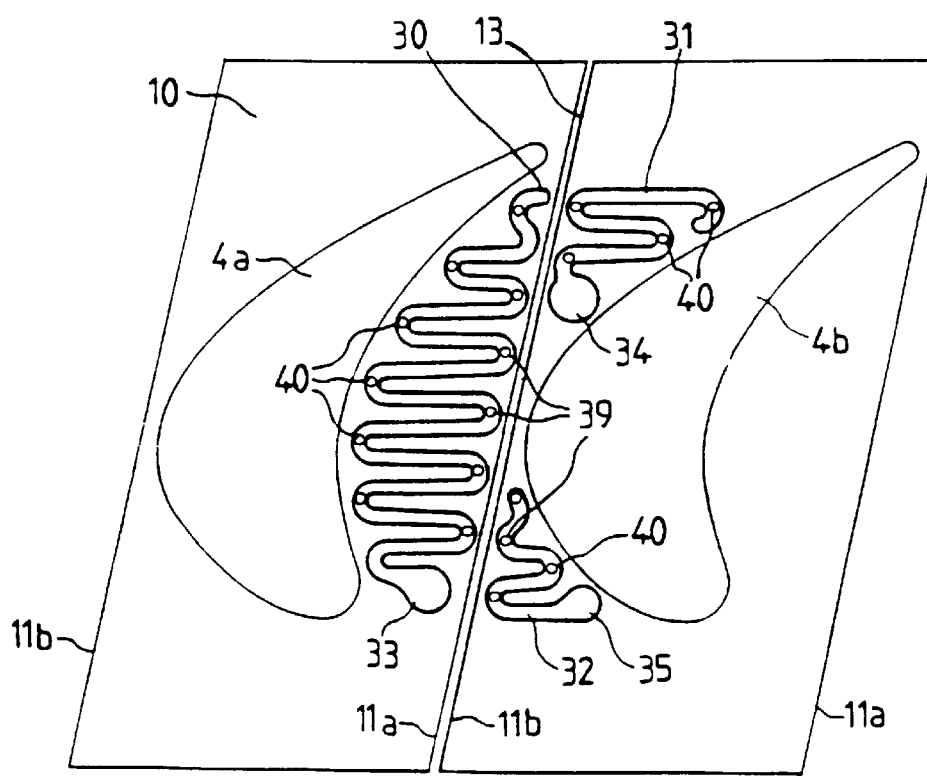
FIG. 3 is a partial, bottom view of two adjacent turbine blades according to the present invention.

As shown in FIGS. 2 and 3, each platform 10 comprises several cooling circuits 30, 31 and 32. The cooling circuits each comprise channels or grooves formed into the lower surface of the platforms 10, the channels or grooves being sealed by the sealing plates 17. The cooling channels have serpentine configurations to maximize their length and area to optimize the heat exchange between the cooling air flowing through the channels and the platforms. Each of the cooling channels comprise straight segments which run substantially parallel to each other and which are generally perpendicular to the longitudinal edges 11a and 11b of the platforms 10, and which are connected by curved segments. In an axial direction along the rotational axis of the turbine rotor, the curved segments are located either adjacent to one of the longitudinal edges 11a, 11b of the platform 10, or adjacent to the airfoil portion of the turbine blades 4. A cooling air collector, 33, 34 and 35, is located at the forward end of each of the cooling channels 30, 31 and 32 and are located near an outlet of a cooling air passage 26 through the shanks 12. Sealing plates 17 have orifices 36, 37 and 38 aligned with the air inlet collectors 33, 34 and 35 to enable the cooling air within the cavity 14 to enter through the cooling air collectors 33, 34 or 35 and pass into the cooling channels 30, 31 and 32.

The cooling air in the cooling channels 30, 31 and 32 is evacuated through venting holes 39, 40 passing through the walls of the platforms 10 and communicating with the hot gas flow G moving over the airfoil portions of the blades 4. Preferably, the venting holes 39, 40 communicate with the curved segments of the cooling channels 30, 31 and 32. As illustrated, the venting holes 39 are located near the longitudinal edges 11a and 11b, and the venting holes 40 are located near the base of the air foil portions of the turbine blades 4. The dimensions of the orifices 36, 37 and 38 through the sealing plates 17 are larger than those of the corresponding air inlet collectors 33, 34 and 35 to enable the air inlet collectors to fully communicate with the cavity 14 regardless of manufacturing tolerance accumulation in the various elements of the turbine rotor.

The foregoing description is provided for illustrative purposes only and should not be construed as in any way limiting this invention, the scope of which is defined solely by the appended claims.

We claim:

1. A cooling system for cooling platforms of turbine blades on a gas turbine rotor, the turbine rotor having a plurality of turbine blades extending from a periphery thereof, each turbine blade having an airfoil portion, a platform having longitudinal edges, a root portion affixed to the turbine rotor, and a shank portion connecting the root portion to the platform, adjacent turbine blades located such that a longitudinal edge of one platform is adjacent to a longitudinal edge of an adjacent platform so as to form a cavity bounded by a portion of the periphery of the turbine rotor, the shank portions of adjacent turbine blades and the platforms of adjacent turbine blades, the cooling system comprising:

a) at least one cooling air supply passage to supply cooling air to the cavity;

b) at least one cooling channel in a side of the platform facing the turbine rotor, the at least one cooling channel having a cooling air collector at an end located adjacent to the at least one cooling air supply passage and communicating with the cavity, and a plurality of venting holes passing through the other side of the platform, the venting holes being distributed along and communicating with the at least one cooling channel; and, c) a sealing plate extending across surfaces of adjacent platforms facing toward the turbine rotor so as to seal any gap between the adjacent longitudinal edges, and to cover the at least one cooling channel, the sealing plate having an orifice aligned with the cooling air collector of the at least one cooling channel enabling cooling air in the cavity to enter the at least one cooling channel and exit through the plurality of venting holes to thereby cool the platform.

2. The cooling system of claim 1 wherein the at least one cooling channel has a serpentine configuration.

3. The cooling system of claim 2 wherein the serpentine configuration comprises a plurality of linear, substantially parallel segments connected by curved segments.

4. The cooling system of claim 3 wherein at least one curved segment is located adjacent to a longitudinal edge.

5. The cooling system of claim 3 wherein at least one curved segment is located adjacent to the airfoil portion of the turbine blade.

6. The cooling system of claim 3 wherein the venting holes communicate with the curved segments.

7. The cooling system of claim 1 wherein the cooling air collector is located at a forward end of the at least one cooling channel.

8. The cooling system of claim 1 wherein the at least one cooling air supply passage comprises a first passage passing through the root portion and communicating with a second passing in the shank portion which communicates with the cavity.

9. The cooling system of claim 1 wherein the orifice in the sealing plate is larger than the corresponding cooling air collector.

* * * * *